Patented June 3, 1941

2,244,192

UNITED STATES PATENT OFFICE 2,244,192

PREPARATION OF POLYAMIDES

Paul J. Flory, North College Hill, Ohio, assignor to E. I. du Pont de Nemours & Company, Wilmington, Del., a corporation of Delaware No Drawing. Application September 8, 1939, Serial No. 294,027

8 Claims. (Cl. 260—78)

This invention relates to polymeric materials, and more particularly to the production of fiber-forming polyamides.

The synthetic linear fiber-forming polyamides with which this invention is concerned are those of the diamine-dibasic acid type described in U. S. Patent 2,130,948. Characteristic properties of these polyamides are that they can be cold drawn into fibers showing molecular orientation along the fiber axis, and that they yield upon hydrolysis with hydrochloric acid the dibasic acid and the diamine hydrochloride.

The diamines previously preferred for the manufacture of the linear polyamides, whether of the non-fiber-forming or high molecular weight fiber-forming variety, have been the aliphatic diamines. The preference for the aliphatic diamines in commercial practice, as compared with the aromatic diamines, has been due chiefly to the fact that dicarboxylic acids react much more slowly with aromatic diamines than with aliphatic diamines, the reaction in the case of the aromatic diamines being third order, whereas with aliphatic diamines the reaction is of the second order. This fact would not in itself be so serious were it not for the additional fact that polyamides derived from aromatic diamines and dicarboxylic acids undergo more or less thermal decomposition at the temperature used to prepare the polymer. Thus the rate of decomposition may offset the rate of polymerization before the desired degree of polymerization is attained. The aromatic diamines, furthermore, are much weaker bases than the aliphatic diamines, wherefore the otherwise desirable method of forming the polymers through the diamine-dibasic acid salt is precluded. There is also in the case of certain aromatic diamines a greater tendency to form monomeric cyclic compounds. Since many of the aromatic diamines are readily available a process for the ready production of the linear polyamides from these diamines is of economic importance.

This invention has as an object a new and improved process for the manufacture of synthetic linear polyamides, and particularly fiber-forming polyamides, from aromatic diamines. A further object is the production of new fiber-forming polyamides. Other objects will appear hereinafter.

These objects are accomplished by heating under polymerizing conditions an aromatic diamine having at least one hydrogen atom attached to each amino nitrogen atom with a dicarboxylic acid in the presence of an acid catalyst. For the successful practice of this invention the diamine and the dicarboxylic acid, respectively, should each have a radical length of at least 5, the term "radical length" being defined, as in the above mentioned patent, as the number of atoms in the chain constituting the radical of the diamine or dicarboxylic acid. In the case of reactants containing a ring system, the shortest segment of the ring is considered in determining the radical length. Thus, aromatic diamines having a radical length of 5 are 1,3-diamines or meta-diamines. The preferred diamines are diprimary diamines. It is necessary in order to obtain the advantages of this invention that the acid catalysts have a dissociation constant greater than $2 \times 10^{-3}$, since acidic materials generally, such as halogen salts of polyvalent metals, are incapable of increasing the rate of the reaction to the extent obtained by the acids used herein, that is to say, to the extent of five- or ten-fold.

The above mentioned aromatic diamine and dicarboxylic acid are heated together in the presence of the acid catalyst under polymerizing conditions until a polyamide of the desired properties is formed. The practice of the present invention includes the production of the low-molecular weight, non-fiber-forming polyamides useful in the coating and impregnating arts, as well as the high-molecular weight or fiber-forming polyamides. When the fiber-forming polyamides are desired, the required superpolymeric stage can be tested for by touching the molten polymer with a rod and drawing it away. If the said stage has been reached, a continuous filament of considerable strength and pliability is obtained. In general this stage is reached when the polymer has an intrinsic viscosity of about 0.3, where intrinsic viscosity is defined as in U. S. Patent 2,130,948.

This invention is particularly useful for the production of fiber-forming polyamides from aromatic di-primary meta-diamines. These polyamides have distinctive and valuable properties as compared with other polyamides made from aromatic diamines. Heretofore they have not been obtained or proposed, however, apparently since the polyamides obtained from aliphatic diamines have possessed generally more desirable properties, and since greater difficulty has been encountered in the production of fiber-forming polyamides from aromatic rather than aliphatic diamines. When reacted with dicarboxylic acids the aromatic meta-diamines yield polyamides having lower melting points, as a rule, than polyamides similarly prepared from other aromatic diamines. This fact permits polymerization at a lower temperature and avoids excessive thermal decomposition, these factors being very important when high molecular weight or fiber-forming products are desired. Aromatic meta-diamines have practically no tendency to form monomeric cyclic compounds. Aliphatic diamines of the same radical length are, on the other hand, less suitable for the preparation of fiber-forming polyamides.

The preparation of the linear polyamides by the process of this invention can be carried out in the absence of a solvent, or in the presence of a solvent, for example, a phenol, or in the presence of a nonsolvent, for example, mineral oil. The first stages of the reaction can be carried out in the presence of water, alcohol, or the like. Reaction temperatures in the range of 200–300° C. are most suitable, although reaction can be effected at considerably lower temperatures, for example, 170° C. Temperatures above 300° C. are generally to be avoided, because of thermal decomposition. In general a temperature slightly above the melting point of the polymer should be selected. Because of the sensitivity of aromatic diamines and of polyamides prepared therefrom to oxidation at high temperatures, the reaction must be effected in the absence of oxygen if a light colored product is desired. This can be accomplished by operating in a vacuum or in the presence of an inert gas. Antioxidants also may be used.

As the acid catalysts, it is preferred to use such acids as phosphoric, sulfuric, hydrochloric, and para-toluene-sulfonic acids, and boron phosphate which functions like phosphoric acid. The preferred amount of catalyst ranges from 0.01 to 0.5% of the weight of the polyamide-forming composition.

The following examples in which parts are by weight are illustrative of the methods used in practicing my invention:

EXAMPLE I

*Polymeric meta-phenylene sebacamide*

A mixture of 4888 parts of colorless, redistilled meta-phenylenediamine, 9095 parts of sebacic acid, and 2.80 parts of phosphoric acid was heated in a reaction vessel into which a slow stream of carbon dioxide was introduced. The mixture was heated at atmospheric pressure for 0.5 hour by means of the vapors of boiling phenol (B. P. 182° C.), for 0.5 hour by means of the vapors of boiling naphthalene (B. P. 218° C.), for 0.5 hour by means of the vapors of boiling diphenyl (B. P. 255° C.), and finally for 2 hours at the same temperature at 20 mm. pressure (absolute). The polymer thus obtained was an amber colored, transparent solid having a melting point of about 190° C. and an intrinsic viscosity of 0.66.

The polymer was spun into continuous filaments of fairly uniform diameter by gas pressure extrusion of the polymer from a spinneret having an orifice about 0.02 inch in diameter and maintained at 255° C. by means of a suitable vapor bath. The gauge pressure required to extrude the polymer was 15–18 lbs./sq. in. The extruded filament was reeled upon a motor driven drum having a diameter of 1.1 inches at such a rate that the average denier was 16.2. The resulting slightly yellow filaments were lustrous and had a silky appearance. Other properties of the filaments were: elongation 240%, denier at break 4.8, tensile at break 4.0, tenacity 1.18 g./denier,

EXAMPLE II

*Polymeric meta-phenylene sebacamide*

A mixture of 4.500 parts of colorless, redistilled meta-phenylenediamine, 8.414 parts of sebacic acid, and 0.026 part of sulfuric acid diluted with 0.2 part of water, was heated in a reaction vessel into which a slow stream of oxygen-free nitrogen was introduced. The mixture was heated at atmospheric pressure for 0.5 hour by means of the vapors of boiling phenol (B. P. 182° C.), for 0.5 hour by means of the vapors of boiling naphthalene (B. P. 218° C.), for 0.5 hour by means of the vapors of boiling diphenyl (B. P. 255° C.), and finally for 1 hour at the same temperature at 10 mm. pressure (absolute). The polymer thus obtained was an amber colored, transparent glass-like solid melting at 190° C. and having an intrinsic viscosity of 0.56.

EXAMPLE III

*Polymeric meta-phenylene adipamide*

A mixture of 10.90 parts of pure meta-phenylene-diamine, 14.61 parts of adipic acid, and 0.013 part of phosphoric acid was heated in the reaction vessel described in Example II as follows: At atmospheric pressure for 0.5 hour by means of the vapors of boiling phenol (B. P. 182° C.), for 0.5 hour by means of the vapors of boiling naphthalene (B. P. 218° C.), for 0.1 hour by means of the vapors of boiling diphenyl (B. P. 255° C.), and then for 0.5 hour by means of the vapors of boiling diphenylene oxide (B. P. 287° C.) at 10 mm. pressure (absolute). The amber colored product melted at about 255° C. and had an intrinsic viscosity of 0.56. By touching the molten polymer with a rod and drawing it away continuous filaments were readily obtained.

EXAMPLE IV

*Polymeric 2,4-toluylene adipamide (60%)-sebacamide (40%)*

A mixture of 36.33 parts of colorless redistilled 2,4-toluylenediamine, 24.25 parts of sebacic acid, 26.30 parts of adipic acid, and 0.045 part of phosphoric acid was heated in the reaction vessel described in Example II as follows: At atmospheric pressure for 0.5 hour by means of the vapors of boiling phenol (B. P. 182° C.), for 0.5 hour by means of the vapors of boiling naphthalene (B. P. 218° C.), 0.5 hour by means of the vapors of boiling diphenyl (B. P. 255° C.), and then for 1 hour at the same temperature at 10 mm. pressure (absolute). The interpolymer thus obtained was an amber colored, transparent solid melting at 185° C. and having an intrinsic viscosity of 0.45. Continuous filaments capable of being cold drawn were readily obtained by touching the surface of the molten polymer with a rod and withdrawing the rod.

EXAMPLE V

*Polymeric 2,4-toluylene adipamide*

A mixture of 24.42 parts of colorless redistilled 2,4-toluylenediamine, 29.22 parts of adipic acid, and 0.030 part of phosphoric acid was heated in the reaction vessel described in Example II as follows: At atmospheric pressure for 1 hour by means of the vapors of boiling phenol (B. P. 182° C.), for 1 hour by means of the vapors of boiling diphenyl (B. P. 255° C.), and then for 1 hour at the same temperature at 10 mm. pressure (absolute). The poly-2,4-toluylene adipamide prepared in accordance with the above procedure was an amber colored solid melting at about 200° C. Continuous filaments were readily obtainable by touching the surface of the molten polymer with a rod and withdrawing the rod.

EXAMPLE VI

Polymeric meta-phenylene sebacamide

A mixture of 5.45 parts of colorless redistilled meta-phenylenediamine, 10.10 parts of sebacic acid, and 0.040 part of para-toluenesulfonic acid was heated in a closed reaction vessel at 220°–230° C. during 1.5 hours. The reaction vessel was cooled, opened and heated as follows: At atmospheric pressure for 1 hour at 218° C., for 1 hour at 255° C., for 1 hour at 287° C. and then at the latter temperature for 3 hours at 2 mm. pressure (absolute). The polymer thus obtained had an intrinsic viscosity of 0.72 and exhibited excellent fiber-forming properties.

EXAMPLE VII

Polymeric 2,4-toluylene sebacamide

A mixture of 5.00 parts of colorless redistilled 2,4-toluylenediamine, 8.276 parts of sebacic acid and 0.023 part of borophosphoric acid was heated in the reaction vessel described in Example II as follows: At atmospheric pressure for 1.5 hours at 218° C., for 4 hours at 255° C., and finally for 1 hour at 255° C. at 10 mm. pressure (absolute). The amber colored polymer had an intrinsic viscosity of 0.54.

As additional examples of aromatic meta-diamines which can be used in the process of this invention may be mentioned 2,6-toluylenediamine, 3,5-toluylenediamine, 1,4-dimethyl-3,5-diaminobenzene, 1,3 - dimethyl - 2,4 - diaminobenzene, 1,3-dimethyl-4,6-diaminobenzene, 1,2-dimethyl-3,5-diaminobenzene, 1-ethyl-2,4-diaminobenzene, 1-ethyl-3,5-diaminobenzene, and 1-ethyl-2,6-diaminobenzene. Of the meta-diamines meta - phenylenediamine and 2,4 - toluylenediamine are the preferred members. Examples of aromatic diamines which have a radical length greater than 5 which can be used are p-phenylenediamine, p,p' - diphenyldiamine, and 2,5-toluylenediamine.

Additional examples of dibasic acids which can be used are glutaric acid, beta-methyl adipic acid, pimelic acid, suberic acid, azelaic acid, tetradecanedioic acid, octadecanedioic acid, para-phenylenediacetic acid, isophthalic acid, diglycolic acid, and thiodibutyric acid,

The use of aryl esters of dicarboxylic acids is also within the scope of this invention. Examples of such esters are diphenyl adipate and dicresyl sebacate.

Other useful acid catalysts are hydrobromic acid, camphor sulfonic acid, alpha and beta-naphthalene sulfonic acids, benzene sulfonic acid, and alkyl sulfonic acids.

This invention is not limited to the preparation of products from a single aromatic diamine and a single dicarboxylic acid. Likewise, a part of the acid reactant may consist of a dibasic acid having a radical length less than 5, for example malonic acid. Furthermore, it is possible to use amide-forming derivatives of the diamines and/or dibasic acids. Typical amide-forming derivatives of the dibasic acids are anhydrides and esters. It is to be understood therefore that the reference in the description and claims to diamines and dicarboxylic acids includes their amide-forming derivatives. It is also within the scope of this invention to replace a portion of the diamine and/or dicarboxylic acid with some other bifunctional reactant, for example, a monoaminomonocarboxylic acid, a hydroxy acid, a glycol, or amide-forming derivatives of such reactants.

The preparation of fiber-forming polyamides from aromatic diamines can be carried out in a number of ways. As indicated in the examples, chemically equivalent quantities of diamine and dicarboxylic acid together with the acid catalyst may be heated in a closed reaction vessel, under pressure if desired, in the absence of solvent or diluent to reaction temperature (usually 150–300° C.) until a low molecular weight polyamide is formed. Although it is most convenient to add the acid catalyst at the start of the reaction, it is also within the scope of this invention to add the acid catalyst at any time during the heat treatment. The water liberated during the reaction is then permitted to escape and the low molecular weight product converted into a fiber-forming product by heating the polymer at reaction temperature (usually 150–300° C.) under atmospheric or reduced pressure, preferably reduced pressure. As also indicated in the examples, the reaction may be carried out in an open vessel in the absence of a solvent or diluent since the aromatic diamines are only very slightly volatile under the reaction conditions. In the final stages of the condensation the conditions should be such that the by-product of the reaction, except when the by-product is a phenol, can escape if a fiber-forming product is desired. Although polyamides, as compared with most organic compounds, are fairly resistant to oxidation, the high temperatures required for their preparation cause discoloration in contact with air and for this reason it is desirable to carry out the reaction in the presence of an inert gas, such as nitrogen, hydrogen or carbon dioxide. It is also important to exclude oxygen from the polymer during spinning, if the polymer is being spun from melt.

Continuous filaments may be obtained in a number of ways. The polymer may be formed into filaments by extruding the molten polymer through orifices into an atmosphere where it congeals into filaments as indicated in the example. The polymer may also be dissolved in a suitable solvent, the solution extruded into a coagulating bath, and the resulting filaments continuously collected on a suitable revolving drum, or a solution of the polymer may be extruded into a heated chamber where the solvent is removed by evaporation.

For certain purposes it is desirable that the polymer be viscosity stable, i. e., not alter appreciably in viscosity (molecular weight) when heated at its melting point. Viscosity stable polyamides can be prepared by using a small excess (up to about 5 molar per cent) of the diamine or dicarboxylic acid reactant or by incorporating in the reaction mixture a small amount, generally 0.1–5.0%, of a monoamine or monocarboxylic acid or amide-forming derivative thereof. Acetic acid, 2-ethylhexylamine, and ethyl butyrate are examples of viscosity stabilizers.

The products of this invention are useful in making fibers and bristles. Many other valuable products, for example, rods, hollow tubing, films, foils and ribbon, can be made from the polymeric amides. They may also be used in molding compositions and in coating and impregnating compositions. It is understood that in all of the above uses the products of this invention may be mixed with other materials, such as plasticizers, resins, cellulose derivatives, or pigments.

This invention makes possible the ready production of linear polyamides from aromatic diamines which, because of their slower rate of reaction, have been less desirable heretofore than the aliphatic diamines. As previously mentioned, the slow rate of reaction of aromatic diamines and dicarboxylic acids in the absence of a catalyst causes excessive decomposition. By the process of this invention it is possible to increase the rate of amidation of aromatic diamines and thus reach the desired degree of polymerization before the rate of thermal decomposition becomes sufficient to offset the rate of polymerization.

The polyamides obtained by the process of this invention are in general amber colored resinous products which soften at temperatures considerably below their melting points. In this respect they differ from polyamides made from aliphatic diamines, since polyamides of the latter type are crystalline and exhibit relatively sharp melting points. By reason of this difference polyamides derived from aromatic diamines have certain advantages over those derived from aliphatic diamines. One such advantage is that they are more readily formed into transparent films because they show much less tendency to crystallize. Another advantage is that they have better felting properties. When cold drawn filaments of the aromatic type polyamides are heated, they contract at temperatures considerably below their melting points. When such filaments are heated in admixture with higher melting or infusible filaments, therefore, the contraction of the aromatic polyamide filaments produces a felting effect, the aromatic polyamide filaments functioning as the binder. This felting is preferably applied to short or staple fibers. A further difference between the aromatic and aliphatic type polyamides is that the former, by virtue of their aromatic rings, are much more susceptible to substitution reactions, such as sulfonation, nitration and halogenation. This characteristic makes it possible to modify, by chemical reaction, the properties of polyamides derived from aromatic diamines.

As many apparently widely different embodiments of this invention may be made without departing from the spirit and scope thereof, it is to be understood that I do not limit myself to the specific embodiments thereof except as defined in the appended claims.

I claim:

1. A process for making polyamides which comprises heating at polymerizing temperatures, in the presence of a non-carboxylic acid catalyst having a dissociation constant not less than $2 \times 10^{-3}$, substantially equimolecular amounts of an aromatic diamine having at least one hydrogen atom attached to each amino nitrogen atom and having a radical length of at least 5, the said aromatic diamine being one in which each amino group is nuclearly attached to an aromatic ring, and a dicarboxylic acid having a radical length of at least 5, and continuing the reaction until the resulting polymeric product has an intrinsic viscosity of at least 0.3.

2. The process set forth in claim 1 in which the said diamine is meta-phenylene diamine.

3. The process set forth in claim 1 in which the said diamine is 2,4-toluylene diamine.

4. The process set forth in claim 1 in which the said catalyst is phosphoric acid.

5. A polyamide which is capable of being formed into continuous pliable fibers and which yields upon hydrolysis with hydrochloric acid substantially equimolecular proportions of a diprimary aromatic meta-diamine hydrochloride, both of whose amino groups are nuclearly attached to an aromatic ring, and a dicarboxylic acid having a radical length of at least 5; the said polyamide being one which has an intrinsic viscosity of at least 0.3.

6. A polyamide substantially identical with that obtained by reacting substantially equimolecular amounts of a diprimary aromatic meta-diamine, both of whose amino groups are nuclearly attached to an aromatic ring, and a dicarboxylic acid having a radical length of at least 5, in the presence of a non-carboxylic acid catalyst having a dissociation constant not less than $2 \times 10^{-3}$; the said polyamide having an intrinsic viscosity of at least 0.3.

7. The polyamide set forth in claim 6 in which the said diamine is meta-phenylene diamine.

8. The polyamide set forth in claim 6 in which the said diamine is 2,4-toluylene diamine.

PAUL J. FLORY.